United States Patent
Chen et al.

(10) Patent No.: US 11,871,253 B2
(45) Date of Patent: Jan. 9, 2024

(54) METHOD AND APPARATUS FOR IMPROVING SCHEDULING MODE SIDELINK COMMUNICATION IN A WIRELESS COMMUNICATION SYSTEM

(71) Applicant: ASUSTek Computer Inc., Taipei (TW)

(72) Inventors: Wei-Yu Chen, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 18 days.

(21) Appl. No.: 16/739,504

(22) Filed: Jan. 10, 2020

(65) Prior Publication Data

US 2020/0229006 A1 Jul. 16, 2020

Related U.S. Application Data

(60) Provisional application No. 62/791,463, filed on Jan. 11, 2019.

(51) Int. Cl.
*H04W 24/04* (2009.01)
*H04W 72/04* (2023.01)
*H04W 72/12* (2023.01)

(52) U.S. Cl.
CPC .......... *H04W 24/04* (2013.01); *H04W 72/04* (2013.01); *H04W 72/12* (2013.01)

(58) Field of Classification Search
CPC ...... H04W 24/04; H04W 72/04; H04W 72/12
See application file for complete search history.

(56) References Cited

U.S. PATENT DOCUMENTS

| 2017/0055311 A1* | 2/2017 | Van Phan | H04W 76/23 |
| 2020/0045674 A1* | 2/2020 | Tseng | H04W 72/04 |
| 2020/0053835 A1* | 2/2020 | Ye | H04L 1/08 |

OTHER PUBLICATIONS

Intel Corporation et al: "Clarification on the use of exceptional resource pool", 3GPP Draft; R2-145220 Prose Exceptional Case Final, 3rd Generation Partnership Project (3GPP), Mobile Competence Centre ; 650, Route Des Lucioles ; F-06921 Sophia-Antipolis Cedex ; France 9 vol. RAN WG2, No. San Francisco, USA; Nov. 17, 2014-Nov. 21, 2014 Nov. 17, 2014 (Nov. 17, 2014), XP050877298.

(Continued)

*Primary Examiner* — Rhonda L Murphy
(74) *Attorney, Agent, or Firm* — Skaar Ulbrich Macari, P.A.

(57) ABSTRACT

A method and apparatus are disclosed from the perspective of a first device for performing sidelink communication. In one embodiment, the method includes the first device being configured with network scheduling mode for sidelink by a base station. The method further includes the first device being configured with a first set of resources with a first time pattern for sidelink transmission through a dedicated signaling. The method also includes the first device using the first set of resources to perform sidelink transmission when the first device does not detect beam failure. Furthermore, the method includes the first device detecting a beam failure between the first device and the base station. In addition, the method includes the first device using the first set of resources to perform sidelink transmission to a second device when the beam failure is not resolved.

18 Claims, 9 Drawing Sheets

(56) References Cited

OTHER PUBLICATIONS

Intel Corporation: "On D2D Resource Allocation Modes and In/Edge/Out of Coverage Definition", 3GPP Draft; R1-142018 Intel—Modes and RSRP, 3rd Generation Partnership Project (3GPP), Mobile Competence Centre ; 650, Route Des Lucioles ; F-06921 Sophia-Antipolis Cedex ; France vol. RAN WG1, No. Seoul, Korea; May 19, 2014-May 23, 2014 May 18, 2014 (May 18, 2014), XP050789138.

Huawei et al: "Exception handling for T310 Exceptional Case", 3GPP Draft; R2-145127 Exception Handling for T310 Exceptional Case, 3rd Generation Partnership Project (3GPP), Mobile Competence Centre ; 650, Route Des Lucioles ; F-06921 Sophia-Antipolis Cedex ; Fra ,vol. RAN WG2, No. San Francisco, US; Nov. 17, 2014-Nov. 21, 2014 Nov. 17, 2014 (Nov. 17, 2014), XP050877237.

European Search Report from corresponding EP Application No. 20151118.5, dated May 18, 2020.

* cited by examiner

METHOD AND APPARATUS FOR IMPROVING SCHEDULING MODE SIDELINK COMMUNICATION IN A WIRELESS COMMUNICATION SYSTEM

CROSS-REFERENCE TO RELATED APPLICATIONS

The present application claims the benefit of U.S. Provisional Patent Application Ser. No. 62/791,463 filed on Jan. 11, 2019, the entire disclosure of which is incorporated herein in its entirety by reference.

FIELD

This disclosure generally relates to wireless communication networks, and more particularly, to a method and apparatus for improving scheduling schedule mode sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device for performing sidelink communication. In one embodiment, the method includes the first device being configured with network scheduling mode for sidelink by a base station. The method further includes the first device being configured with a first set of resources with a first time pattern for sidelink transmission through a dedicated signaling. The method also includes the first device using the first set of resources to perform sidelink transmission when the first device does not detect beam failure. Furthermore, the method includes the first device detecting a beam failure between the first device and the base station. In addition, the method includes the first device using the first set of resources to perform sidelink transmission to a second device when the beam failure is not resolved.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 24.386 V15.1.0, "User Equipment (UE) to V2X control function; protocol aspects"; TS 36.321 V15.3.0, "Evolved Universal Terrestrial Radio Access (E-UTRA); Medium Access Control (MAC) protocol specification"; RAN1 #94 chairman's note; TS 36.331 V15.3.0, "Evolved Universal Terrestrial Radio Access (E-UTRA); Radio Resource Control (RRC); Protocol specification"; TS 38.321 V15.3.0 "Medium Access Control (MAC) protocol specification"; and RAN2 #104 chairman's note. The standards and documents listed above are hereby expressly incorporated by reference in their entirety.

Figure 1:
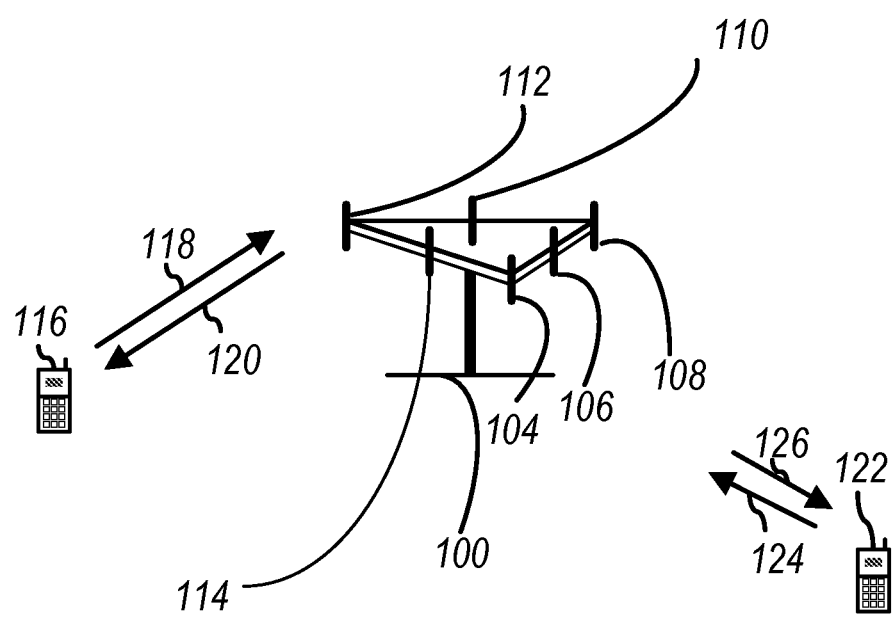
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
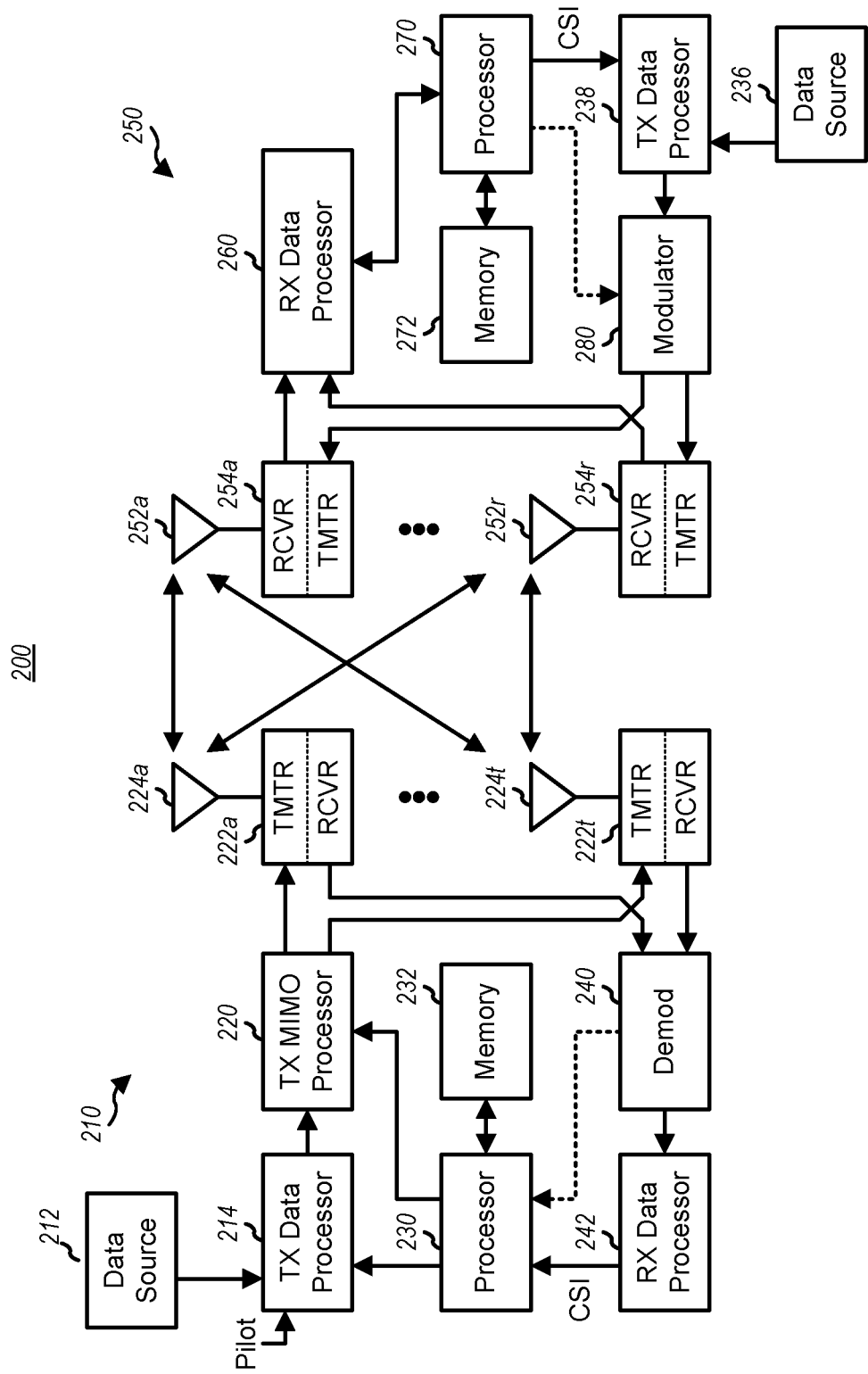
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
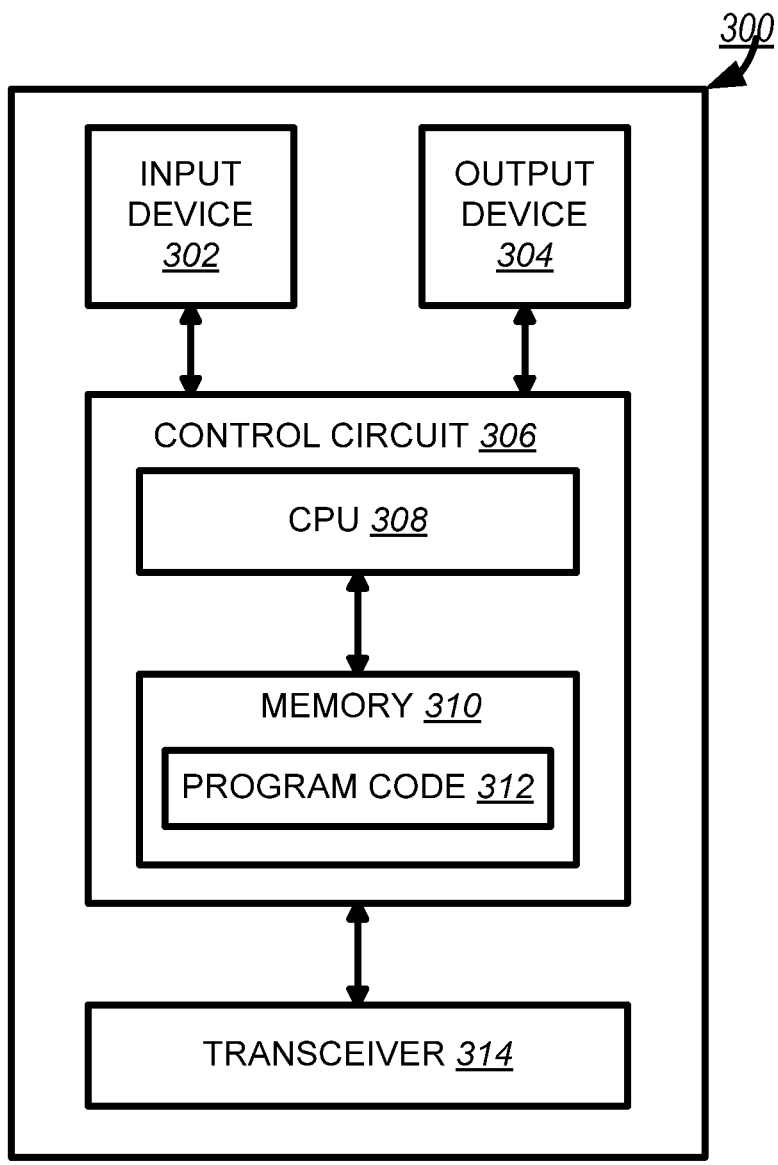
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
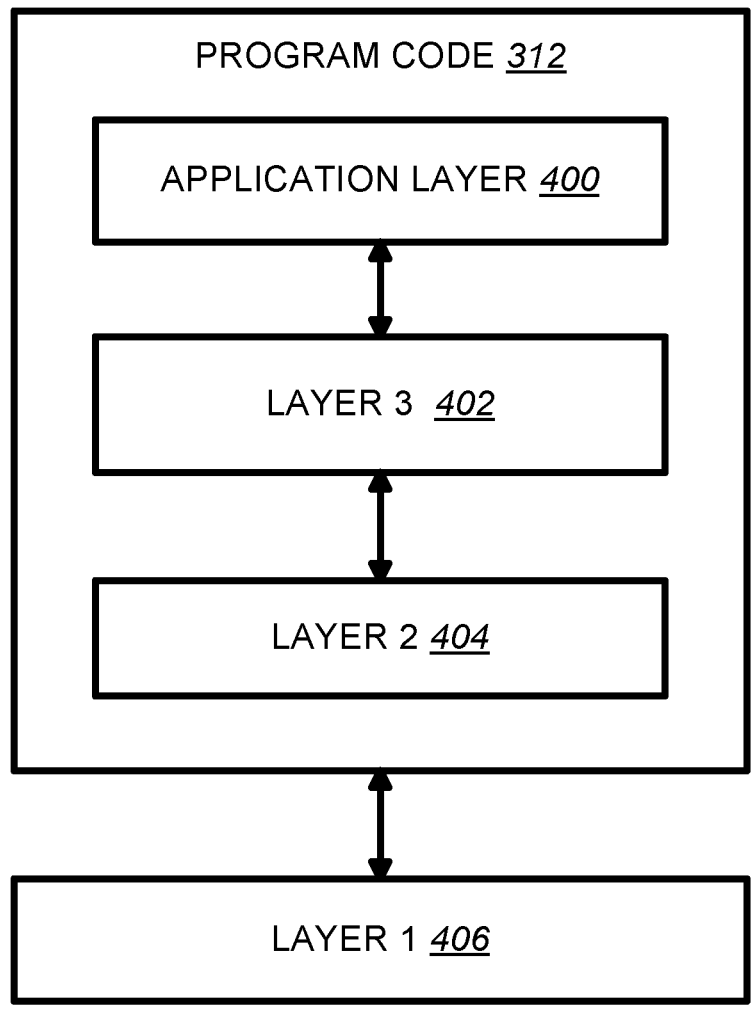
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.331 provides the following description of RRC (Radio Resource Control) procedure related to V2X (Vehicle-to-Everything) sidelink communication:

5.10.1d Conditions for V2X Sidelink Communication Operation

When it is specified that the UE shall perform V2X sidelink communication operation only if the conditions defined in this section are met, the UE shall perform V2X sidelink communication operation only if:

1> if the UE's serving cell is suitable (RRC_IDLE or RRC_CONNECTED); and if either the selected cell on the frequency used for V2X sidelink communication operation belongs to the registered or equivalent PLMN as specified in TS 24.334 [69] or the UE is out of coverage on the frequency used for V2X sidelink communication operation as defined in TS 36.304 [4, 11.4]; or 1> if the UE's serving cell (for RRC_IDLE or RRC_CONNECTED) fulfils the conditions to support V2X sidelink communication in limited service state as specified in TS 23.285 [78, 4.4.8]; and if either the serving cell is on the frequency used for V2X sidelink communication operation or the UE is out of coverage on the frequency used for V2X sidelink communication operation as defined in TS 36.304 [4, 11.4]; or 1> if the UE has no serving cell (RRC_IDLE);

5.10.12 V2X Sidelink Communication Monitoring

A UE capable of V2X sidelink communication that is configured by upper layers to receive V2X sidelink communication shall:

1> if the conditions for sidelink operation as defined in 5.10.1d are met:
  2> if in coverage on the frequency used for V2X sidelink communication, as defined in TS 36.304 [4, 11.4]:
    3> if the frequency used to receive V2X sidelink communication is included in v2x-InterFreqInfoList within RRCConnectionReconfiguration or in v2x-InterFreqInfoList within SystemInformationBlockType21 or SystemInformationBlockType26 of the serving cell/Pcell, and v2x-CommRxPool is included in SL-V2X-InterFreqUE-Config within v2x-UE-ConfigList in the entry of v2x-InterFreqInfoList for the concerned frequency:
      4> configure lower layers to monitor sidelink control information and the corresponding data using the pool of resources indicated in v2x-CommRxPool; 3> else:
      4> if the cell chosen for V2X sidelink communication reception broadcasts SystemInformationBlockType21 including v2x-CommRxPool in sl-V2X-ConfigCommon or,
      4> if the UE is configured with v2x-CommRxPool included in mobilityControlInfoV2X in RRCConnectionReconfiguration:
        5> configure lower layers to monitor sidelink control information and the corresponding data using the pool of resources indicated in v2x-CommRxPool;
  2> else (i.e. out of coverage on the frequency used for V2X sidelink communication, as defined in TS 36.304 [4, 11.4]):
    3> if the frequency used to receive V2X sidelink communication is included in v2x-InterFreqInfoList within RRCConnectionReconfiguration or in v2x-InterFreqInfoList within SystemInformationBlockType21 or SystemInformationBlockType26 of the serving cell/PCell, and v2x-CommRxPool is included in SL-V2X-InterFreqUE-Config within v2x-UE-ConfigList in the entry of v2x-InterFreqInfoList for the concerned frequency:
      4> configure lower layers to monitor sidelink control information and the corresponding data using the pool of resources indicated in v2x-CommRxPool;
    3> else:
      4> configure lower layers to monitor sidelink control information and the corresponding data using the pool of resources that were preconfigured (i.e. v2x-CommRxPoolList in SL-V2X-Preconfiguration defined in 9.3);

5.10.13 V2X Sidelink Communication Transmission

5.10.13.1 Transmission of V2X Sidelink Communication

A UE capable of V2X sidelink communication that is configured by upper layers to transmit V2X sidelink communication and has related data to be transmitted shall:

1> if the conditions for sidelink operation as defined in 5.10.1d are met:
  2> if in coverage on the frequency used for V2X sidelink communication as defined in TS 36.304 [4, 11.4]; or
  2> if the frequency used to transmit V2X sidelink communication is included in v2x-InterFreqInfoList in RRCConnectionReconfiguration or in v2x-InterFreqInfoList within SystemInformationBlockType21 or SystemInformationBlockType26:
    3> if the UE is in RRC_CONNECTED and uses the PCell or the frequency included in v2x-InterFreqInfoList in RRCConnectionReconfiguration for V2X sidelink communication:
      4> if the UE is configured, by the current PCell with commTxResources set to scheduled:
        5> if T310 or T311 is running; and if the PCell at which the UE detected physical layer problems or radio link failure broadcasts SystemInformationBlockType21 including v2x-CommTxPoolExceptional in sl-V2X-ConfigCommon, or v2x-CommTxPoolExceptional is included in v2x-InterFreqInfoList for the concerned frequency in SystemInformationBlockType21 or SystemInformationBlockType26 or RRCConnectionReconfiguration; or
        5> if T301 is running and the cell on which the UE initiated connection re-establishment broadcasts SystemInformationBlockType21 including v2x-CommTxPoolExceptional in sl-V2X-ConfigCommon, or v2x-CommTxPoolExceptional is included in v2x-InterFreqInfoList for the concerned frequency in SystemInformationBlockType21 or SystemInformationBlockType26; or
        5> if T304 is running and the UE is configured with v2x-CommTxPoolExceptional included in mobilityControlInfoV2X in RRCConnectionReconfiguration or in v2x-InterFreqInfoList for the concerned frequency in RRCConnectionReconfiguration:
          6> configure lower layers to transmit the sidelink control information and the corresponding data based on random selection using the pool of resources indicated by v2x-CommTxPoolExceptional as defined in TS 36.321 [6];
        5> else:

6> configure lower layers to request E-UTRAN to assign transmission resources for V2X sidelink communication;
4> else if the UE is configured with v2x-CommTxPoolNormalDedicated or v2x-CommTxPoolNormal or p2x-CommTxPoolNormal in the entry of v2x-InterFreqInfoList for the concerned frequency in sl-V2X-ConfigDedicated in RRCConnectionReconfiguration:
5> if the UE is configured to transmit non-P2X related V2X sidelink communication and a result of sensing on the resources configured in v2x-CommTxPoolNormalDedicated or v2x-CommTxPoolNormal in the entry of v2x-InterFreqInfoList for the concerned frequency in RRCConnectionReconfiguration is not available in accordance with TS 36.213 [23]; or
5> if the UE is configured to transmit P2X related V2X sidelink communication and selects to use partial sensing according to 5.10.13.1a, and a result of partial sensing on the resources configured in v2x-CommTxPoolNormalDedicated or p2x-CommTxPoolNormal in the entry of v2x-InterFreqInfoList for the concerned frequency in RRCConnectionReconfiguration is not available in accordance with TS 36.213 [23]:
6> if v2x-CommTxPoolExceptional is included in mobilityControlInfoV2X in RRCConnectionReconfiguration (i.e., handover case); or
6> if v2x-CommTxPoolExceptional is included in the entry of v2x-InterFreqInfoList for the concerned frequency in RRCConnectionReconfiguration; or
6> if the PCell broadcasts SystemInformationBlockType21 including v2x-CommTxPoolExceptional in sl-V2X-ConfigCommon or v2x-CommTxPoolExceptional in v2x-InterFreqInfoList for the concerned frequency or broadcasts SystemInformationBlockType26 including v2x-CommTxPoolExceptional in v2x-InterFreqInfoList for the concerned frequency:
7> configure lower layers to transmit the sidelink control information and the corresponding data based on random selection using the pool of resources indicated by v2x-CommTxPoolExceptional as defined in TS 36.321 [6];
5> else if the UE is configured to transmit P2X related V2X sidelink communication:
6> select a resource pool according to 5.10.13.2;
6> perform P2X related V2X sidelink communication according to 5.10.13.1a;
5> else if the UE is configured to transmit non-P2X related V2X sidelink communication:
6> configure lower layers to transmit the sidelink control information and the corresponding data based on sensing (as defined in TS 36.321 [6] and TS 36.213 [23]) using one of the resource pools indicated by v2x-commTxPoolNormalDedicated or v2x-CommTxPoolNormal in the entry of v2x-InterFreqInfoList for the concerned frequency, which is selected according to 5.10.13.2;
3> else:
4> if the cell chosen for V2X sidelink communication transmission broadcasts SystemInformationBlockType21 or SystemInformationBlockType26:
5> if the UE is configured to transmit non-P2X related V2X sidelink communication, and if SystemInformationBlockType21 includes v2x-CommTxPoolNormalCommon or v2x-CommTxPoolNormal in v2x-InterFreqInfoList for the concerned frequency, or SystemInformationBlockType26 includes v2x-CommTxPoolNormal in v2x-InterFreqInfoList for the concerned frequency, and if a result of sensing on the resources configured in v2x-CommTxPoolNormalCommon or v2x-CommTxPoolNormal in v2x-InterFreqInfoList for the concerned frequency is available in accordance with TS 36.213 [23]:
6> configure lower layers to transmit the sidelink control information and the corresponding data based on sensing (as defined in TS 36.321 [6] and TS 36.213 [23]) using one of the resource pools indicated by v2x-CommTxPoolNormalCommon or v2x-CommTxPoolNormal in v2x-InterFreqInfoList for the concerned frequency, which is selected according to 5.10.13.2;
5> else if the UE is configured to transmit P2X related V2X sidelink communication, and if SystemInformationBlockType21 includes p2x-CommTxPoolNormalCommon or p2x-CommTxPoolNormal in v2x-InterFreqInfoList for the concerned frequency, or SystemInformationBlockType26 includes p2x-CommTxPoolNormal in v2x-InterFreqInfoList for the concerned frequency, and if the UE selects to use random selection according to 5.10.13.1a, or selects to use partial sensing according to 5.10.13.1a and a result of partial sensing on the resources configured in p2x-CommTxPoolNormalCommon or p2x-CommTxPoolNormal in v2x-InterFreqInfoList for the concerned frequency is available in accordance with TS 36.213 [23]:
6> select a resource pool from p2x-CommTxPoolNormalCommon or p2x-CommTxPoolNormal in v2x-InterFreqInfoList for the concerned frequency according to 5.10.13.2, but ignoring zoneConfig in SystemInformationBlockType21 or SystemInformationBlockType26;
6> perform P2X related V2X sidelink communication according to 5.10.13.1a;
5> else if SystemInformationBlockType21 includes v2x-CommTxPoolExceptional in sl-V2X-ConfigCommon or v2x-CommTxPoolExceptional in v2x-InterFreqInfoList for the concerned frequency, or SystemInformationBlockType26 includes v2x-CommTxPoolExceptional in v2x-InterFreqInfoList for the concerned frequency:
6> from the moment the UE initiates connection establishment until receiving an RRCConnectionReconfiguration including sl-V2X-ConfigDedicated, or until receiving an RRCConnectionRelease or an RRCConnectionReject; or 6> if the UE is in RRC_IDLE and a result of sensing on the resources configured in v2x-CommTxPoolNormalCommon or v2x-CommTxPoolNormal in v2x-InterFreqInfoList for the concerned frequency in Systeminformationblocktype21 or v2x-CommTxPoolNormal in v2x-InterFreqInfoList for the concerned frequency in Systeminformationblocktype26 is not available in accordance with TS 36.213 [23]; or 6> if the UE is in RRC_IDLE and UE selects to use partial sensing according to 5.10.13.1a and a result of partial sensing on the resources configured in p2x-CommTxPoolNormalCommon or p2x-CommTxPoolNormal in v2x-InterFreqInfoList for the concerned frequency in Systeminformationblocktype21 or v2x-CommTxPoolNormal in v2x-InterFreqInfoList for the concerned frequency in Systeminformationblocktype26 is not available in accordance with TS 36.213 [23]:

7> configure lower layers to transmit the sidelink control information and the corresponding data based on random selection (as defined in TS 36.321 [6]) using the pool of resources indicated in v2x-CommTxPoolExceptional;

2> else:

3> configure lower layers to transmit the sidelink control information and the corresponding data based on sensing (as defined in TS 36.321 [6] and TS 36.213 [23]) using one of the resource pools indicated by v2x-CommTxPoolList in SL-V2X-Preconfiguration in case of non-P2X related V2X sidelink communication, which is selected according to 5.10.13.2, or using one of the resource pools indicated by p2x-CommTxPoolList in SL-V2X-Preconfiguration in case of P2X related V2X sidelink communication, which is selected according to 5.10.13.2, and in accordance with the timing of the selected reference as defined in 5.10.8;

The UE capable of non-P2X related V2X sidelink communication that is configured by upper layers to transmit V2X sidelink communication shall perform sensing on all pools of resources which may be used for transmission of the sidelink control information and the corresponding data. The pools of resources are indicated by SL-V2X-Preconfiguration, v2x-CommTxPoolNormalCommon, v2x-CommTxPoolNormalDedicated in sl-V2X-ConfigDedicated, or v2x-CommTxPoolNormal in v2x-InterFreqInfoList for the concerned frequency, as configured above.

NOTE 1: If there are multiple frequencies for which normal or exceptional pools are configured, it is up to UE implementation which frequency is selected for V2X sidelink communication transmission.

5.10.13.2 V2X Sidelink Communication Transmission Pool Selection

For a frequency used for V2X sidelink communication, if zoneConfig is not ignored as specified in 5.10.13.1, the UE configured by upper layers for V2X sidelink communication shall only use the pool which corresponds to geographical coordinates of the UE, if zoneConfig is included in SystemInformationBlockType21 or SystemInformationBlockType26 of the serving cell (RRC_IDLE)/PCell (RRC_CONNECTED) or in RRCConnectionReconfiguration for the concerned frequency, and the UE is configured to use resource pools provided by RRC signalling for the concerned frequency; or if zoneConfig is included in SL-V2X-Preconfiguration for the concerned frequency, and the UE is configured to use resource pools in SL-V2X-Preconfiguration for the frequency, according to 5.10.13.1. The UE shall only use the pool which is associated with the synchronization reference source selected in accordance with 5.10.8.2.

1> if the UE is configured to transmit on p2x-CommTxPoolNormalCommon or on p2x-CommTxPoolNormal in v2x-InterFreqInfoList in SystemInformationBlockType21 or on p2x-CommTxPoolNormal in v2x-InterFreqInfoList in SystemInformationBlockType26 according to 5.10.13.1; or 1> if the UE is configured to transmit on p2x-CommTxPoolList-r14 in SL-V2X-Preconfiguration according to 5.10.13.1; or 1> if zoneConfig is not included in SystemInformationBlockType21 and the UE is configured to transmit on v2x-CommTxPoolNormalCommon or v2x-CommTxPoolNormalDedicated; or 1> if zoneConfig is included in SystemInformationBlockType21 and the UE is configured to transmit on v2x-CommTxPoolNormalDedicated for P2X related V2X sidelink communication and zoneID is not included in v2x-CommTxPoolNormalDedicated; or 1> if zoneConfig is not included in the entry of v2x-InterFreqInfoList for the concerned frequency and the UE is configured to transmit on v2x-CommTxPoolNormal in v2x-InterFreqInfoList or p2x-CommTxPoolNormal in v2x-InterFreqInfoList in RRCConnectionReconfiguration; or 1> if zoneConfig is included in the entry of v2x-InterFreqInfoList for the concerned frequency and the UE is configured to transmit on p2x-CommTxPoolNormal in v2x-InterFreqInfoList in RRCConnectionReconfiguration and zoneID is not included in p2x-CommTxPoolNormal; or 1> if zoneConfig is not included in SL-V2X-Preconfiguration for the concerned frequency and the UE is configured to transmit on v2x-CommTxPoolList in SL-V2X-Preconfiguration for the concerned frequency:

2> select a pool associated with the synchronization reference source selected in accordance with 5.10.8.2;

NOTE 0: If multiple pools are associated with the selected synchronization reference source, it is up to UE implementation which resource pool is selected for V2X sidelink communication transmission.

1> if zoneConfig is included in SystemInformationBlockType21 and the UE is configured to transmit on v2x-CommTxPoolNormalCommon or v2x-CommTxPoolNormalDedicated for non-P2X related V2X sidelink communication; or 1> if zoneConfig is included in SystemInformationBlockType21 and the UE is configured to transmit on v2x-CommTxPoolNormalDedicated for P2X related V2X sidelink communication and zoneID is included in v2x-CommTxPoolNormalDedicated; or 1> if zoneConfig is included in the entry of v2x-InterFreqInfoList for the concerned frequency and if the UE is configured to transmit on v2x-CommTxPoolNormal in v2x-InterFreqInfoList or is configured to transmit on p2x-CommTxPoolNormal in v2x-InterFreqInfoList in RRCConnectionReconfiguration and zoneID is included in p2x-CommTxPoolNormal; or 1> if zoneConfig is included in SL-V2X-Preconfiguration for the concerned frequency and the UE is configured to transmit on v2x-CommTxPoolList in SL-V2X-Preconfiguration for the concerned frequency:
    2> select the pool configured with zoneID equal to the zone identity determined below and associated with the synchronization reference source selected in accordance with 5.10.8.2;

The UE shall determine an identity of the zone (i.e. Zone_id) in which it is located using the following formulae, if zoneConfig is included in SystemInformationBlockType21 or SystemInformationBlockType26 or in SL-V2X-Preconfiguration:

$$x_1 = \text{Floor}(x/L) \text{Mod } Nx;$$

$$y_1 = \text{Floor}(y/W) \text{Mod } Ny;$$

$$\text{Zone\_id} = y_1 * Nx + x_1.$$

The parameters in the formulae are defined as follows:
- L is the value of zoneLength included in zoneConfig in SystemInformationBlockType21 or SystemInformationBlockType26 or in SL-V2X-Preconfiguration;
- W is the value of zoneWidth included in zoneConfig in SystemInformationBlockType21 or SystemInformationBlockType26 or in SL-V2X-Preconfiguration;
- Nx is the value of zoneIdLongiMod included in zoneConfig in SystemInformationBlockType21 or SystemInformationBlockType26 or in SL-V2X-Preconfiguration;
- Ny is the value of zoneIdLatiMod included in zoneConfig in SystemInformationBlockType21 or SystemInformationBlockType26 or in SL-V2X-Preconfiguration;
- x is the geodesic distance in longitude between UE's current location and geographical coordinates (0, 0) according to WGS84 model [80] and it is expressed in meters;
- y is the geodesic distance in latitude between UE's current location and geographical coordinates (0, 0) according to WGS84 model [80] and it is expressed in meters.

The UE shall select a pool of resources which includes a zoneID equals to the Zone_id calculated according to above mentioned formulae and indicated by v2x-CommTxPoolNormalDedicated, v2x-CommTxPoolNormalCommon, v2x-CommTxPoolNormal in v2x-InterFreqInfoList or p2x-CommTxPoolNormal in v2x-InterFreqInfoList in RRCConnectionReconfiguration, or v2x-CommTxPoolList according to 5.10.13.1.

NOTE 1: The UE uses its latest geographical coordinates to perform resource pool selection.
    NOTE 2: If geographical coordinates are not available and zone specific TX resource pools are configured for the concerned frequency, it is up to UE implementation which resource pool is selected for V2X sidelink communication transmission.

5.10.13.3 V2X Sidelink Communication Transmission Reference Cell Selection

A UE capable of V2X sidelink communication that is configured by upper layers to transmit V2X sidelink communication shall:
  1> for each frequency used to transmit V2X sidelink communication, select a cell to be used as reference for synchronisation and DL measurements in accordance with the following:
    2> if the frequency concerns the primary frequency:
      3> use the PCell (RRC_CONNECTED) or the serving cell (RRC_IDLE) as reference;
    2> else if the frequency concerns a secondary frequency:
      3> use the concerned SCell as reference;
    2> else if the UE is in coverage of the concerned frequency:
      3> use the DL frequency paired with the one used to transmit V2X sidelink communication as reference;
    2> else (i.e., out of coverage on the concerned frequency):
      3> use the PCell (RRC_CONNECTED) or the serving cell (RRC_IDLE) as reference, if needed;

The 3GPP RAN1 #94 chairman's note describes the following agreements of NR V2X:

Agreements:
At least two sidelink resource allocation modes are defined for NR-V2X sidelink communication
  Mode 1: Base station schedules sidelink resource(s) to be used by UE for sidelink transmission(s)
  Mode 2: UE determines (i.e. base station does not schedule) sidelink transmission resource(s) within sidelink resources configured by base station/network or pre-configured sidelink resources Notes:
  eNB control of NR sidelink and gNB control of LTE sidelink resources will be separately considered in corresponding agenda items.
  Mode-2 definition covers potential sidelink radio-layer functionality or resource allocation sub-modes (subject to further refinement including merging of some or all of them) where
    a) UE autonomously selects sidelink resource for transmission
    b) UE assists sidelink resource selection for other UE(s)
    c) UE is configured with NR configured grant (type-1 like) for sidelink transmission
    d) UE schedules sidelink transmissions of other UEs RAN1 to continue study details of resource allocation modes for NR-V2X sidelink communication 3GPP TS 36.213 provides the following detail of the energy sensing procedure for V2X sidelink communication:

14.1.1.6 UE Procedure for Determining the Subset of Resources to be Reported to Higher Layers in PSSCH Resource Selection in Sidelink Transmission Mode 4

When requested by higher layers in subframe n for a carrier, the UE shall determine the set of resources to be reported to higher layers for PSSCH transmission according to the following steps. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers. $C_{resel}$ is determined according to Subclause 14.1.1.4B.

If partial sensing is not configured by higher layers then the following steps are used:
  1) A candidate single-subframe resource for PSSCH transmission $R_{x,y}$ is defined as a set of $L_{subCH}$ contiguous sub-channels with sub-channel x+j in subframe $t_y^{SL}$ where j=0, ..., $L_{subCH}-1$. The UE shall assume that any set of $L_{subCH}$ contiguous sub-channels included in the corresponding PSSCH resource pool (described in 14.1.5) within the time interval $[n+T_1, n+T_2]$ corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.

2) The UE shall monitor subframes $$t^{SL}_{n'-10 \times P_{step}}, t^{SL}_{n'-10 \times P_{step}+1}, \ldots, t^{SL}_{n'-1}$$

except for those in which its transmissions occur, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE has not monitored subframe $t_z^{SL}$ in Step 2.

there is an integer j which meets $y+j \times P'_{rsvp\_TX}=z+P_{step} \times k \times q$ where $j=0, 1, \ldots, C_{resel}-1$, $P'_{rsvp\_TX}=P_{step} \times P_{rsvp\_TX}/100$, k is any value allowed by the higher layer parameter restrictResourceReservationPeriod and $q=1, 2, \ldots, Q$. Here, $$Q = \frac{1}{k} \text{ if } k < 1$$

and $n'-z \leq P_{step} \times k$, where $t_{n'}^{SL}=n$ if subframe n belongs to the set $t_0^{SL}, t_1^{SL}, t_{T_{max}}^{SL}, \ldots$, otherwise subframe is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Sub-clause 14.2.1.

PSSCH-RSRP measurement according to the received SCI format 1 is higher than $Th_{prio_{TX}, prio_{RX}}$.

the SCI format received in subframe $t_m^{SL}$ or the same SCI format 1 which is assumed to be received in subframe(s)

$$t^{SL}_{m+q \times P_{step} \times P_{rsvp\_RX}}$$

determines according to 14.1.1.4C the set of resource blocks and subframes which overlaps with $$R_{x, y+j \times P'_{rsvp\_TX}}$$

for $q=1, 2, \ldots, Q$ and $j=0, 1, \ldots, C_{resel}-1$. Here, $$Q = \frac{1}{P_{rsvp\_RX}}$$

if $P_{rsvp\_RX}<1$ and $n'-m \leq P_{step} \times P_{rsvp\_RX}$, where $t_{n'}^{SL}=n$ if subframe n belongs to the set $(t_0^{SL}, t_1^{SL}, \ldots, t_{T_{max}}^{SL})$, otherwise subframe t is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for $k=0, \ldots, L_{subCH}-1$ in the monitored subframes in Step 2 that can be expressed by $$t^{SL}_{y-P_{step}*j}$$

for a non-negative integer j if $P_{rsvp\_TX} \geq 100$, and $$t^{SL}_{y-P'_{rsvp\_TX}*j}$$

for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

The UE shall report set $S_B$ to higher layers.

3GPP TS 38.321 provides the following detail about beam failure related procedure:

5.17 Beam Failure Detection and Recovery Procedure

The MAC entity may be configured by RRC with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity.

RRC configures the following parameters in the BeamFailureRecoveryConfig and the RadioLinkMonitoringConfig for the Beam Failure Detection and Recovery procedure:

beamFailureInstanceMaxCount for the beam failure detection;

beamFailureDetectionTimer for the beam failure detection;

beamFailureRecoveryTimer for the beam failure recovery procedure;

rsrp-ThresholdSSB: an RSRP threshold for the beam failure recovery;

powerRampingStep: powerRampingStep for the beam failure recovery;

powerRampingStepHighPriority: powerRampingStepHighPriority for the beam failure recovery;

preambleReceivedTargetPower: preambleReceivedTargetPower for the beam failure recovery;

preambleTransMax: preambleTransMax for the beam failure recovery;

scalingFactorBI: scalingFactorBI for the beam failure recovery;

ssb-perRACH-Occasion: ssb-perRACH-Occasion for the beam failure recovery;

ra-ResponseWindow: the time window to monitor response(s) for the beam failure recovery using contention-free Random Access Preamble;

prach-ConfigurationIndex: prach-ConfigurationIndex for the beam failure recovery;

ra-ssb-OccasionMaskIndex: ra-ssb-OccasionMaskIndex for the beam failure recovery;

ra-OccasionList: ra-OccasionList for the beam failure recovery.

The following UE variables are used for the beam failure detection procedure:

BFI_COUNTER: counter for beam failure instance indication which is initially set to 0.

The MAC entity shall:

1> if beam failure instance indication has been received from lower layers:
2> start or restart the beamFailureDetectionTimer;
2> increment BFI_COUNTER by 1;
2> if BFI_COUNTER>=beamFailureInstanceMaxCount:
3> if beamFailureRecoveryConfig is configured for the active UL BWP:
4> start the beamFailureRecoveryTimer, if configured;
4> initiate a Random Access procedure (see subclause 5.1) on the SpCell by applying the parameters powerRampingStep, preambleReceivedTargetPower, and preambleTransMax configured in beamFailureRecoveryConfig.
3> else:
4> initiate a Random Access procedure (see subclause 5.1) on the SpCell.
1> if the beamFailureDetectionTimer expires; or
1> if beamFailureDetectionTimer, beamFailureInstanceMaxCount, or any of the reference signals used for beam failure detection is reconfigured by upper layers:
2> set BFI_COUNTER to 0.
1> if the Random Access procedure is successfully completed (see subclause 5.1):
2> set BFI_COUNTER to 0;
2> stop the beamFailureRecoveryTimer, if configured;
2> consider the Beam Failure Recovery procedure successfully completed.

The 3GPP RAN2 #104 chairman's note includes the following agreements related to V2X:

| Agreements on unicast |
|---|
| 1: For AS-level information required to exchange among UEs via sidelink for SL unicast, RAN2 can consider the followings as a baseline and will check if the AS-level information can be agreed and the details after some progress in RAN2, SA2 and RAN1:<br>UE ID, UE capability, Radio/Bearer configuration, PHY information/configuration (e.g. HARQ, CSI), Resource information/configuration and QoS info |
| 2: AS-level information for SL unicast can be exchanged between gNB and UE for RRC configuration. RAN2 assumes that a UE can provide network with QoS related information and will check if the AS-level information can be agreed and the details after some progress in RAN2, SA2 and RAN1. |
| 3: AS-level information is exchanged via RRC signalling (e.g. PC5-RRC) among UEs via sidelink for SL unicast. New logical channel (SCCH: SL Control Channel) in addition to STCH (SL Traffic Channel) will be also introduced. SCCH carriers PC5-RRC messages. |
| 4: RAN2 will consider both options during SI phase. Further discussion on the definition, procedure and information for each option is needed.<br>Option 1: AS layer connection establishment procedure by PC5-RRC is also needed.<br>Option 2: Upper layer connection establishment procedure is enough. |
| 11: In NR, PC5-C protocol stack includes at least RRC, RLC, MAC and PHY sublayers. Whether to have PDCP sub-layer depends on whether any new PC5 RRC message other than MIB-SL is introduced (e.g. outcome of [103bis#38]). |
| 4: RAN2 will support the case a UE can be configured to perform both mode-1 and mode-2 at the same time assuming RAN1 does not have concern on it. FFS on the scenario which it is applicable. |

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

One or multiple of following assumptions for network side may be used hereafter:

Downlink timing of TRPs in the same cell are synchronized.

RRC layer of network side is in BS.

One or multiple of following assumptions for UE side may be used hereafter:

There are at least two UE (RRC) states: connected state (or called active state) and non-connected state (or called inactive state or idle state). Inactive state may be an additional state or belong to connected state or non-connected state.

In NR, a UE can perform transmission and reception based on beam-forming. Regarding beam operation, the UE could detect beam failure based on reference signals. And the UE could trigger beam failure recovery procedure if the beam problem or failure is detected. The UE will perform a random access procedure for recovering the beam pair between the UE and the base station. The random access procedure could be a contention free random access procedure or a contention based procedure. The details could be found in 3GPP TS 38.321. When the beam failure occurs, the UE may not receive scheduling from the base station.

For a UE in RRC CONNECTED mode, the UE could perform sidelink transmission based on resource configuration provided by the base station. The UE could be configured with Mode1 (i.e. network scheduling mode) or Mode 2 (i.e. UE autonomous resource selection mode) or both (i.e. both Mode 1 and mode 2). Since the UE will need to maintain the connection between the UE and the base station when the UE is in RRC CONNECTED mode, the UE performing sidelink communication will also need to handle beam failure condition. If the beam failure condition occurs when the UE is configured with scheduling mode (i.e. Mode1 or both), the UE may not be able to receive any scheduling from the base station. And sidelink communication performance will be degraded. Currently, it is not clear how UE handle the beam failure when the UE is performing sidelink communication. One or multiple methods listed below could be applied at same time for the UE to handle sidelink communication.

I. Method 1: Using Exceptional Pool

Similar to LTE sidelink, the UE could be configured with an exceptional pool for special cases. Possible special cases for a Mode 1 UE in LTE are listed below:
1. Handover
2. Radio Link Failure or L1 problem
3. Connection re-establishment For beam failure case, the MAC layer may be responsible to detect and to trigger beam failure recovery. In general, the resource pool is controlled by RRC layer. The MAC (Medium Access Control) layer may need to indicate RRC layer about beam failure for RRC layer to trigger reconfiguring or switching resource pool to exceptional pool. In one embodiment, the MAC layer could indicate the RRC layer when beam failure is detected. Alternatively, the MAC layer indicates the RRC layer when receiving the first beam failure instance.

In one embodiment, the UE could select resources in exceptional pool based on random selection for performing sidelink transmission. The exceptional resource pool could be different from the exceptional resource pool for the three special cases. Alternatively, the exceptional resource pool could be the same as the exceptional resource pool for the three special cases. In one embodiment, the exceptional resource pool could be configured through a dedicated signaling. Additionally or alternatively, the exceptional resource pool could be configured through a system information.

II. Method 2: Switching to Mode 2 Resource Pool

Figure 5:
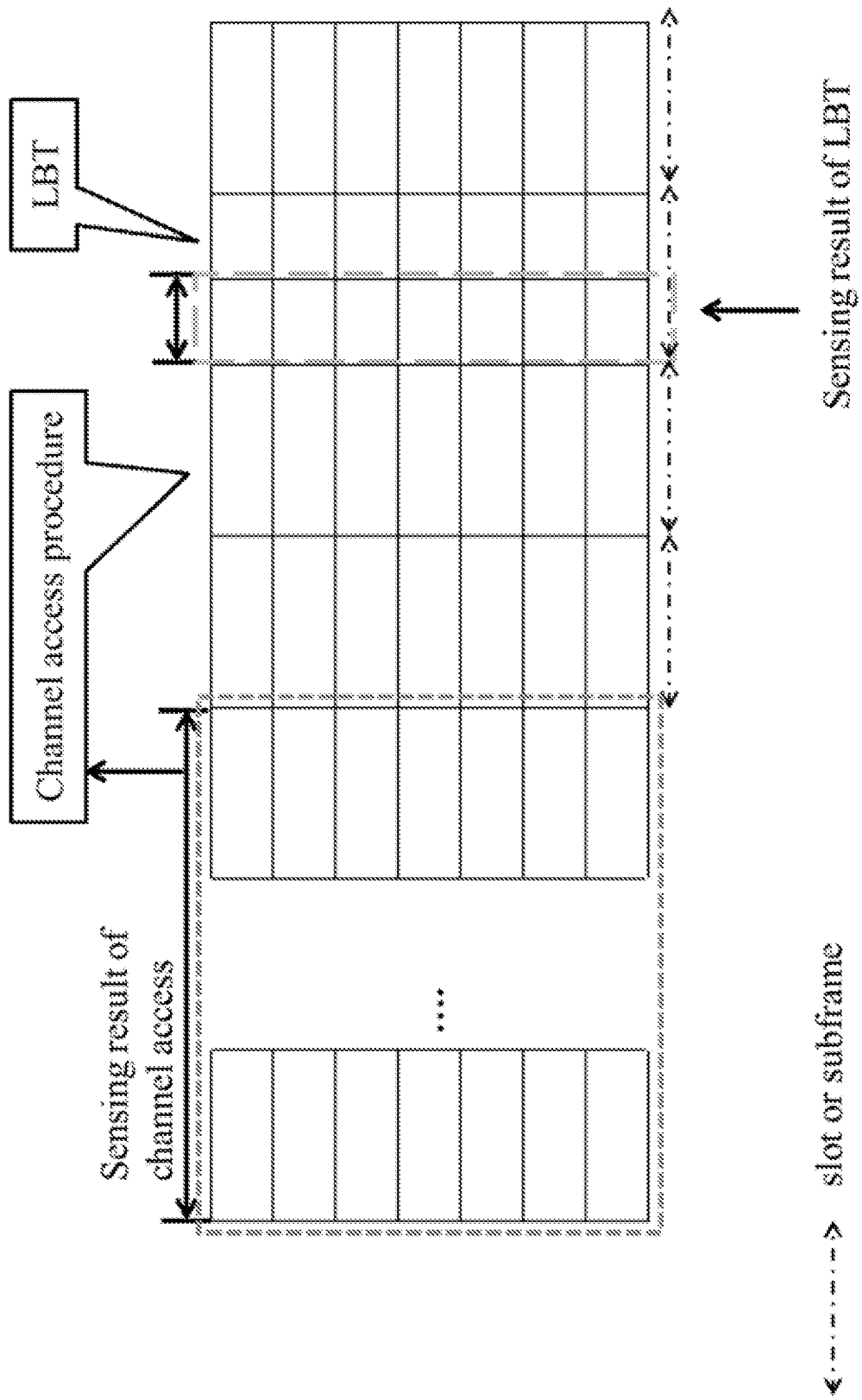
FIG. 5 is a diagram according to one exemplary embodiment.

The UE could be configured with at least one resource pool for performing sidelink communication when beam failure occurs. The UE could select resource in the resource pool for sidelink communication when beam failure occurs. The general difference compared with the Method 1 is that the UE will need to perform energy sensing (e.g. channel access procedure illustrated in exemplary FIG. 5) in the resource pool(s) for selecting sidelink resources in this method.

In one embodiment, the channel access procedure may refer to a UE determining whether a set of resources in a slot is available based on energy sensing result and/or SCI (Sidelink Control Information) decoding in an interval before the slot. A unit of the interval could be slot, subframe, or second. The advantage of the channel access procedure is better resource arrangement. The disadvantage of the channel access procedure is higher latency for data transmission.

In one embodiment, the resource pool(s) could be configured in different carriers. The UE could perform energy sensing before reconfigure or switch resource pool (for Mode 1) to Mode 2 resource pool. The resource pool could be a resource pool originally configured for the UE to perform Mode 2 sidelink communication if the UE is configured with both Mode 1 and Mode 2. The UE could perform resource selection only for dynamic sidelink grant (e.g. sidelink grant for single MAC PDU (Protocol Data Unit)) in the resource pool when beam failure occurs. Alternatively, the UE could perform resource selection for dynamic sidelink grant or SPS sidelink grant (e.g. sidelink grant for multiple MAC PDUs). In one embodiment, the Mode 2 resource pool could be configured through a dedicated signaling. Additionally or alternatively, the Mode 2 resource pool could be configured through a system information.

III. Method 3: Switch to LBT (Listen Before Talk)

In this method, the UE may change to use LBT method for selecting resource in one or multiple resource pool when beam failure occurs. In one embodiment, the LBT procedure may refer to a UE determining whether a set of resources in a slot is available based on energy sensing result in (former) X symbols of the slot. The advantage of the LBT procedure is low latency for data transmission. The disadvantage of the LBT procedure is increasing receiving side decoding complexity. Based on the LBT method, the UE could still be able to obtain resource for sidelink communication.

In one embodiment, the one or multiple resource pools could be configured by the base station. The one or multiple resource pools could be resource pool(s) configured for Mode 1. Alternatively, the one or multiple resource pool could be resource pool(s) for Mode 2. Alternatively, the one or multiple resource pool could be exceptional resource pool(s).

In one embodiment, the one or multiple resource pools could be configured through a dedicated signaling. Alternatively, the one or multiple resource pools could be configured through system information.

IV. Method 4: Grant-Free or SPS (Semi-Persistent Scheduling) Resource or a Set of Configured Resources In this method, the UE could be configured with one or multiple sets of grant free resource(s) for sidelink, one or multiple sets of SPS resource(s) for sidelink, and/or a set of configured resources for sidelink. In one embodiment, the UE may use the one or multiple sets of grant free resource(s), one or multiple set of SPS resource(s), and/or a set of configured resources for sidelink if the UE detects beam failure and/or triggers beam failure recovery. Alternatively, the UE may use the one or multiple sets of grant free resource(s), one or multiple sets of SPS resource(s), and/or a set of configured resources for sidelink regardless whether the beam failure occurs. In one embodiment, the resources mentioned above could be configured through a dedicated signaling. Alternatively, the resources mentioned above could be configured through a system information.

In one embodiment, the grant free resources may refer to a set of periodic sidelink resources which are usable or available to perform a sidelink transmission without activation signaling from base station. The grant free resources may refer to a set of periodic sidelink resources which are shared with other UE(s). The UE may not perform sidelink transmission on resource in an exceptional resource pool (when detecting beam failure and the beam failure is not resolved).

In one embodiment, the SPS resources may refer to a set of periodic sidelink resources which needs to be activated. The SPS resources refer to a set of periodic sidelink resources dedicatedly configured to a UE.

In one embodiment, the set of configured resources for sidelink could be a set of resources with a time pattern and/or a periodicity. The set of configured resources for sidelink may need to be activated by a signaling received from base station for a UE to use. Alternatively, the set of configured resources for sidelink could be used by a UE without activation signaling from base station.

On the other hand, the UE may stop applying above methods and switches back to mode 1 in one or multiple possible conditions. One possible condition could be recovery from the beam failure. Another possible condition could be receiving a reconfiguration (i.e. RRC message) from the base station. An additional possible condition could be receiving an activation signaling from the base station. In one embodiment, the activation signaling could be for activating scheduling mode. The activation signaling could also be a control signaling addressed the UE's sidelink RNTI (Radio Network Temporary Identifier). In addition, the activation signaling could be a sidelink grant.

Another possible condition could be receiving a de-activation signaling from the base station. In one embodiment, the deactivation signaling could be a control signaling addressed the UE's sidelink RNTI. The deactivation signaling could also be a sidelink grant.

In addition, regarding other cases, it may be possible to apply the methods mentioned above for the cases. The possible cases are as follows:
1. Handover
2. Radio Link Failure or L1 problem
3. Connection re-establishment
4. Without receiving any scheduling from base station in a period, after the UE transmitted a sidelink BSR (e.g. the UE applies the method(s) mentioned above if a timer expires or a counter reaches a threshold. Preferably, the timer starts after a sidelink BSR is transmitted)
5. Data available for transmission belonging to a sidelink logical channel and/or a destination over a threshold In one embodiment, L1-problem may mean or may imply physical layer problem(s). A L1 problem may mean or may imply that physical layer of the UE detects physical layer problems (e.g., detecting a consecutive number of out-of-sync indication) or when T310 (or T311) is running.

Additionally or alternatively, beam failure detection and/or beam failure recovery mentioned in the above methods could be replaced with radio link failure (declaration or detection) and/or L1/physical layer problem and/or connection re-establishment and/or handover.

For example, the UE could perform LBT in resource pool(s) when the UE is performing re-establishment or detects radio link failure. As another example, the UE could switch from mode 1/mode 1 data to mode 2 to perform sidelink transmission based a resource pool.

As another example, a sidelink logical channel (e.g. sidelink DRB) or a sidelink destination (e.g. source-destination pair) could be configured with network scheduling mode. If data amount of the sidelink logical channel or the sidelink destination is over a threshold, the UE could start to apply above one or multiple methods for transmitting the data. In one embodiment, the UE may apply the method(s) when the UE is still performing sidelink transmission based on network scheduling mode (e.g. receiving sidelink grant(s) from base station and performing transmission(s) based on the sidelink grant(s)).

Regarding above methods, the UE may apply the methods to data for scheduling (e.g. data belonging to logical channel and/or destination configured with Mode 1) if the UE is configured with both Mode 1 and Mode 2. In one embodiment, the UE could apply the method(s) if the UE is performing or is going to perform a contention free random access for beam failure.

Figure 6:
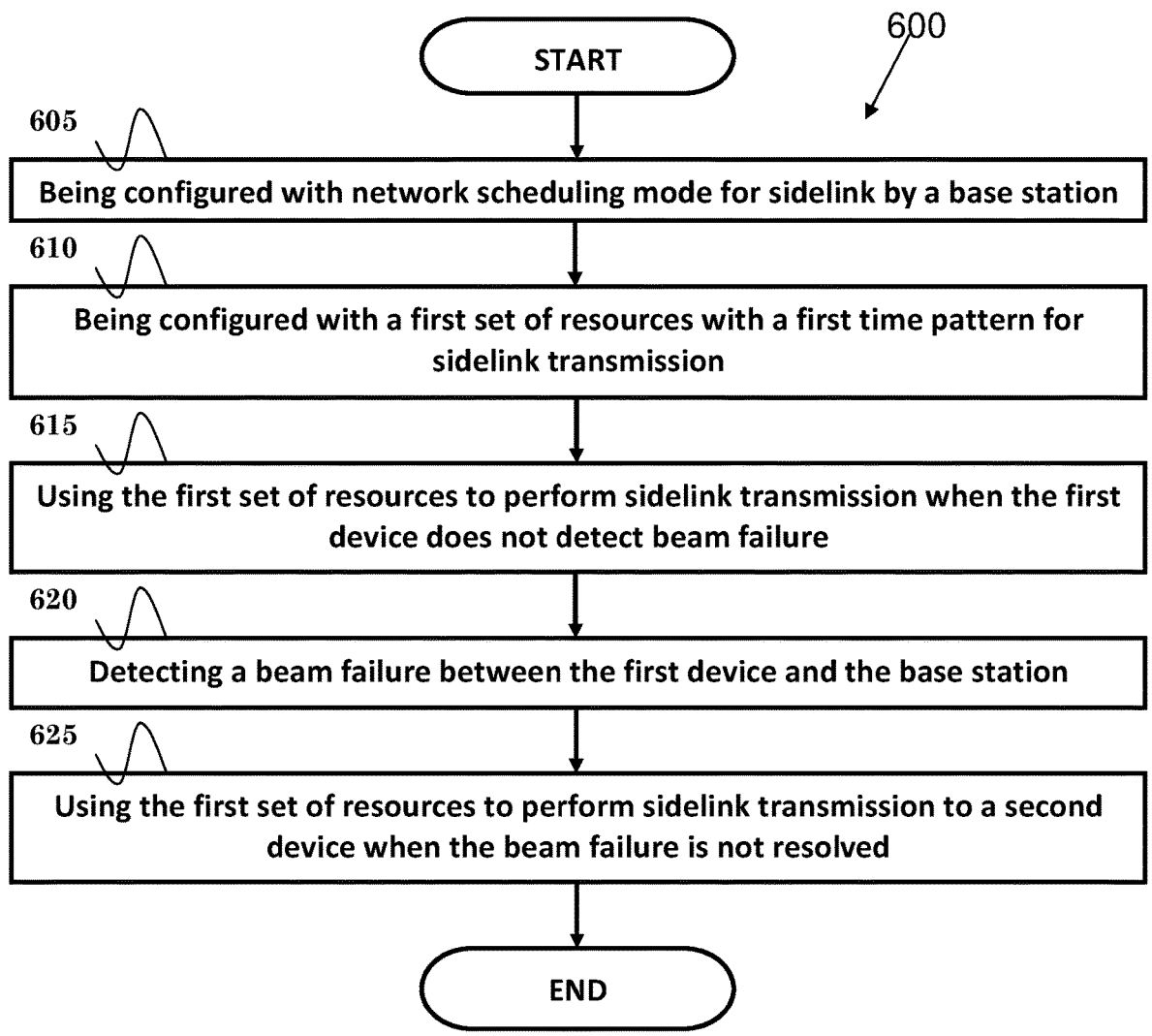
FIG. 6 is a flow chart according to one exemplary embodiment.

FIG. 6 is a flow chart 600 according to one exemplary embodiment from the perspective of a first device for performing sidelink communication. In step 605, the first device is configured with network scheduling node for sidelink by a base station. In step 610, the first device is configured with a first set of resources with a first time pattern for sidelink transmission through a dedicated signaling (such as a RRC message). In step 615, the first device uses the first set of resources to perform sidelink transmission when the first device does not detect beam failure. In step 620, the first device detects a beam failure between the first device and the base station. In step 625, the first device uses the first set of resources to perform sidelink transmission to a second device when the beam failure is not resolved.

In one embodiment, the first set of resources with the first time pattern could be sidelink grant free resources. The first set of resources with the first time pattern could be sidelink SPS (Semi-Persistent Scheduling) resources.

In one embodiment, the beam failure could be detected due to (or in response to) reaching maximum times of beam failure instance. When the first device detects the beam failure and the beam failure is not resolved, the first device may not perform sidelink transmission on resource in an exceptional resource pool. The exceptional resource pool could be (pre-)configured through a system information.

In one embodiment, the first device could be in RRC CONNECTED. The first set of resources with the first time pattern may be usable or available to perform a sidelink transmission without receiving an activation command. The first device may use the first set of resources (to perform sidelink transmission) when the first device detects the beam failure and not resolved. The first time pattern could include a periodicity or a bitmap for indicating transmission opportunities. In one embodiment, the first time pattern may indicate periodic sidelink transmission opportunities. In one embodiment, the first device may use a resource belonging to the first set of resources to perform a sidelink transmission to a second device when the beam failure is not resolved.

Referring back to FIGS. 3 and 4, in one exemplary embodiment of a first device for performing sidelink communication, the device 300 includes a program code 312 stored in the memory 310. The CPU 308 could execute program code 312 to enable the first device (i) to be configured with network scheduling mode for sidelink by a base station, (ii) to be configured with a first set of resources with a first time pattern for sidelink transmission through a dedicated signaling, (iii) to use the first set of resources to perform sidelink transmission when the first device does not detect beam failure, (iv) to detect a beam failure between the first device and the base station, and (v) to use the first set of resources to perform sidelink transmission to a second device when the beam failure is not resolved. Furthermore, the CPU 308 can execute the program code 312 to perform all of the above-described actions and steps or others described herein.

Figure 7:
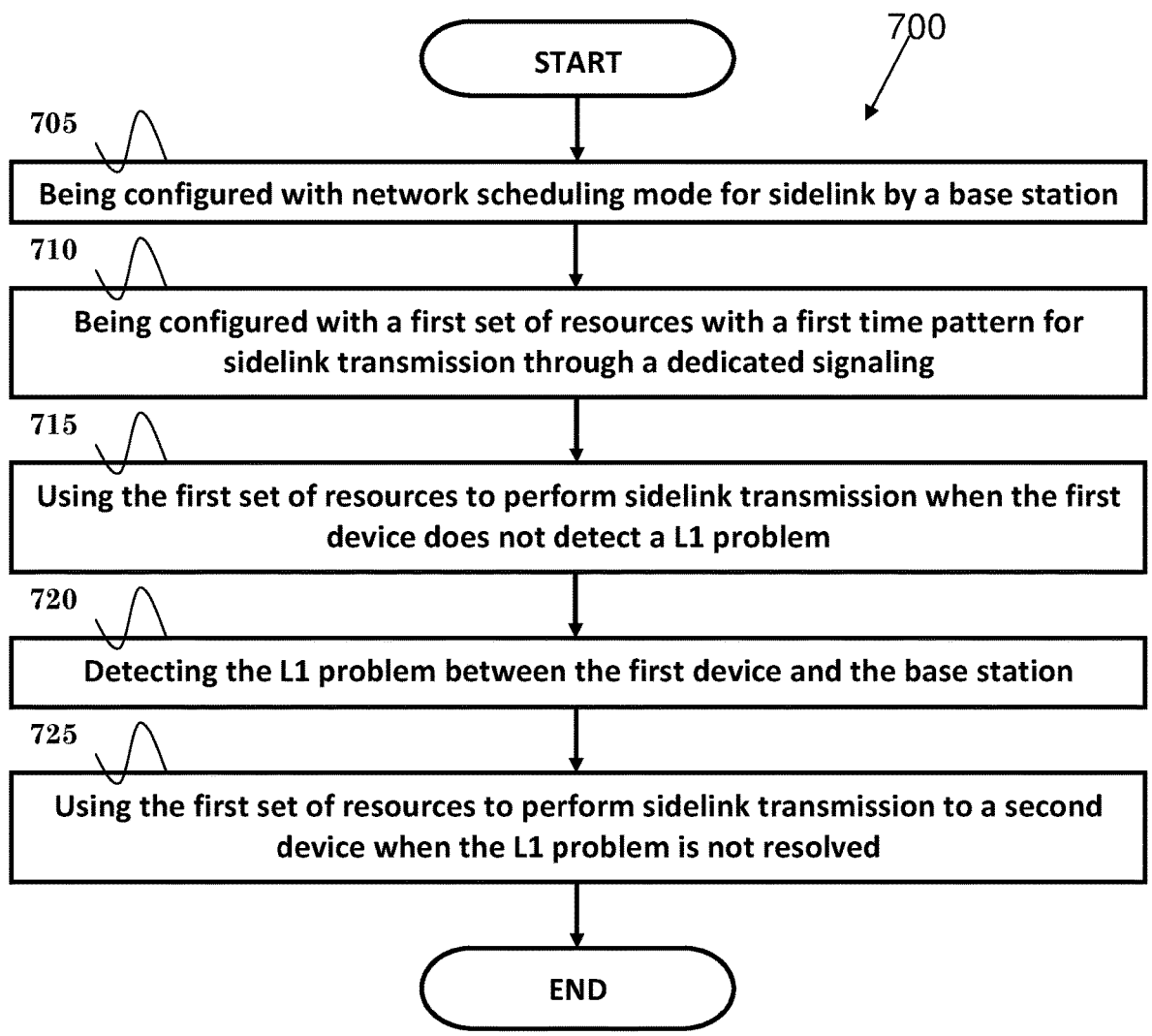
FIG. 7 is a flow chart according to one exemplary embodiment.

FIG. 7 is a flow chart 700 according to one exemplary embodiment from the perspective of a first device for performing sidelink communication. In step 705, the first device is configured with network scheduling mode for sidelink by a base station. In step 710, the first device is configured with a first set of resources with a first time pattern for sidelink transmission through a dedicated signaling (such as a RRC message). In step 715, the first device uses the first set of resources to perform sidelink transmission when the first device does not detect a L1 problem. In step 720, the first device detects the L1 problem between the first device and the base station. In step 725, the first device uses the first set of resources to perform sidelink transmission to a second device if when the L1 problem is not resolved.

In one embodiment, the first set of resources with the first time pattern could be sidelink grant free resources. The first set of resources with the first time pattern could be sidelink SPS resources. The first device could be in RRC CONNECTED. The first set of resources with the first time pattern may be usable or available to perform a sidelink transmission without receiving an activation command.

In one embodiment, the L1 problem could be that physical layer of the first device detects physical layer problems via detecting a number of consecutive out-of-sync indications or when T310 (or T311) is running. When the first device detects the L1 problem and the L1 problem is not resolved, the first device may not perform sidelink transmission on resource in an exceptional resource pool. The exceptional resource pool could be (pre-)configured through a system information. In one embodiment, the first time pattern may include a periodicity or a bitmap for indicating (periodic) sidelink transmission opportunities. In one embodiment, the first device may use a resource belonging to the first set of resources to perform a sidelink transmission to a second device when the L1 problem is not resolved.

Referring back to FIGS. 3 and 4, in one exemplary embodiment of a first device for performing sidelink communication, the device 300 includes a program code 312 stored in the memory 310. The CPU 308 could execute program code 312 to enable the first device (i) to be configured with network scheduling mode for sidelink by a base station, (ii) to be configured with a first set of resources with a first time pattern for sidelink transmission through a dedicated signaling, (iii) to use the first set of resources to perform sidelink transmission when the first device does not detect a L1 problem, (iv) to detect the L1 problem between the first device and the base station, and (v) to use the first set of resources to perform a sidelink transmission to a second device when the L1 problem is not resolved. Furthermore, the CPU 308 can execute the program code 312 to perform all of the above-described actions and steps or others described herein.

Figure 8:
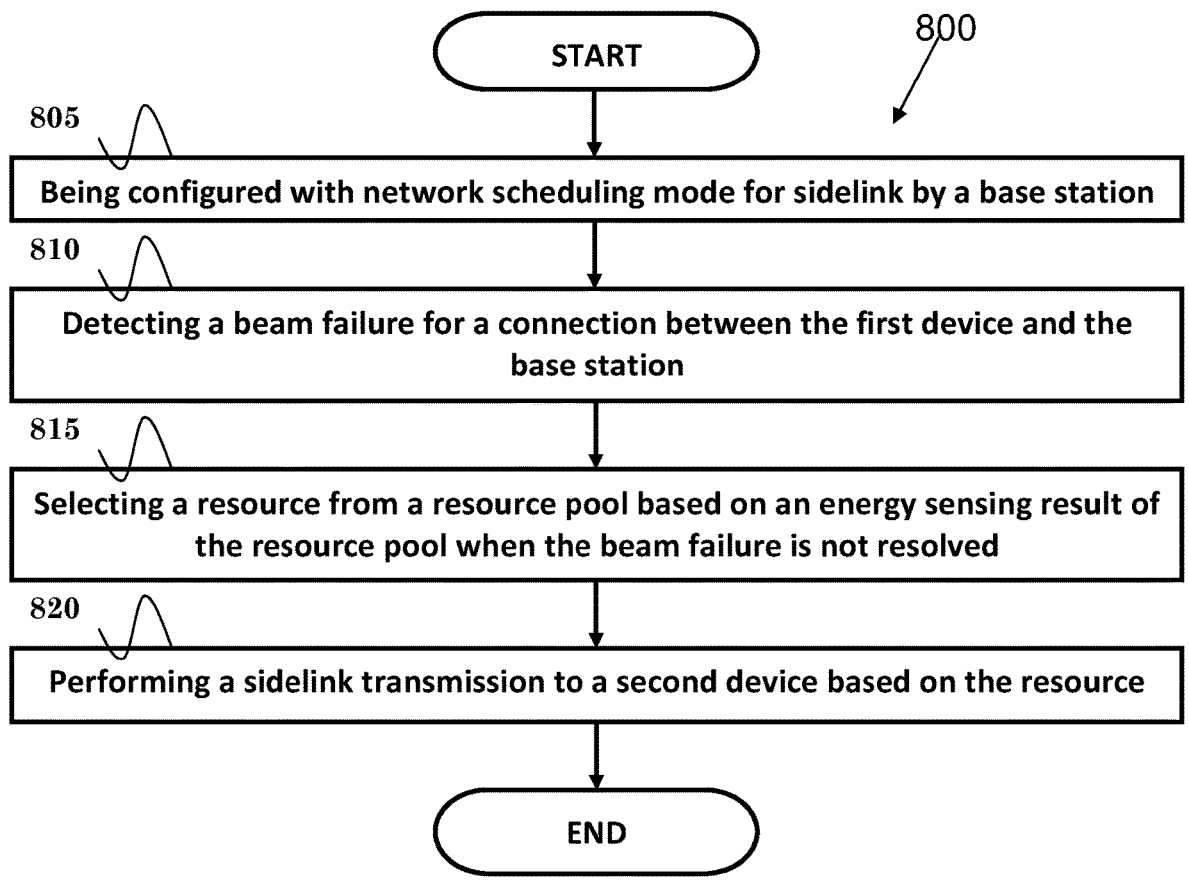
FIG. 8 is a flow chart according to one exemplary embodiment.

FIG. 8 is a flow chart 800 according to one exemplary embodiment from the perspective of a first device for performing sidelink communication. In step 805, the first device is configured with network scheduling mode for sidelink by a base station. In step 810, the first device detects a beam failure for a connection between the first device and the base station. In step 815, the first device selects a resource from a resource pool based on an energy sensing result of the resource pool when the beam failure is not resolved. In step 820, the first device performs a sidelink transmission to a second device based on the resource.

In one embodiment, the beam failure could be detected due to (or in response to) reaching maximum times of beam failure instance. The connection may be a beam pair link or a Uu connection.

In one embodiment, the first device may be in RRC CONNECTED. The resource pool could be a resource pool configured by the base station.

In one embodiment, the first device could be configured with autonomous resource selection mode. The resource pool could be a resource pool configured for the first device to perform autonomous resource selection mode, and/or a resource pool configured for the first device to perform the network scheduling mode. Furthermore, the resource pool could be a resource pool configured by a dedicated signal (such as a RRC message) or by a system information.

In one embodiment, the energy sensing result could be derived based on a listen-before-talk procedure, or based on a channel access procedure. In one embodiment, the resource could be a sidelink grant corresponding to single MAC PDU transmission, or to multiple MAC PDU transmissions.

In one embodiment, the first device may switch to autonomous resource selection mode when beam failure is detected. The sidelink transmission could include data associated with or configured to network scheduling mode.

Referring back to FIGS. 3 and 4, in one exemplary embodiment of a first device for performing sidelink communication, the device 300 includes a program code 312 stored in the memory 310. The CPU 308 could execute program code 312 to enable the first device (i) to be configured with network scheduling mode for sidelink by a base station, (ii) to detect a beam failure for a connection between the first device and the base station, (iii) to select a resource from a resource pool based on an energy sensing result of the resource pool when the beam failure is not resolved, and (iv) to perform a sidelink transmission to a second device based on the resource. Furthermore, the CPU 308 can execute the program code 312 to perform all of the above-described actions and steps or others described herein.

Figure 9:
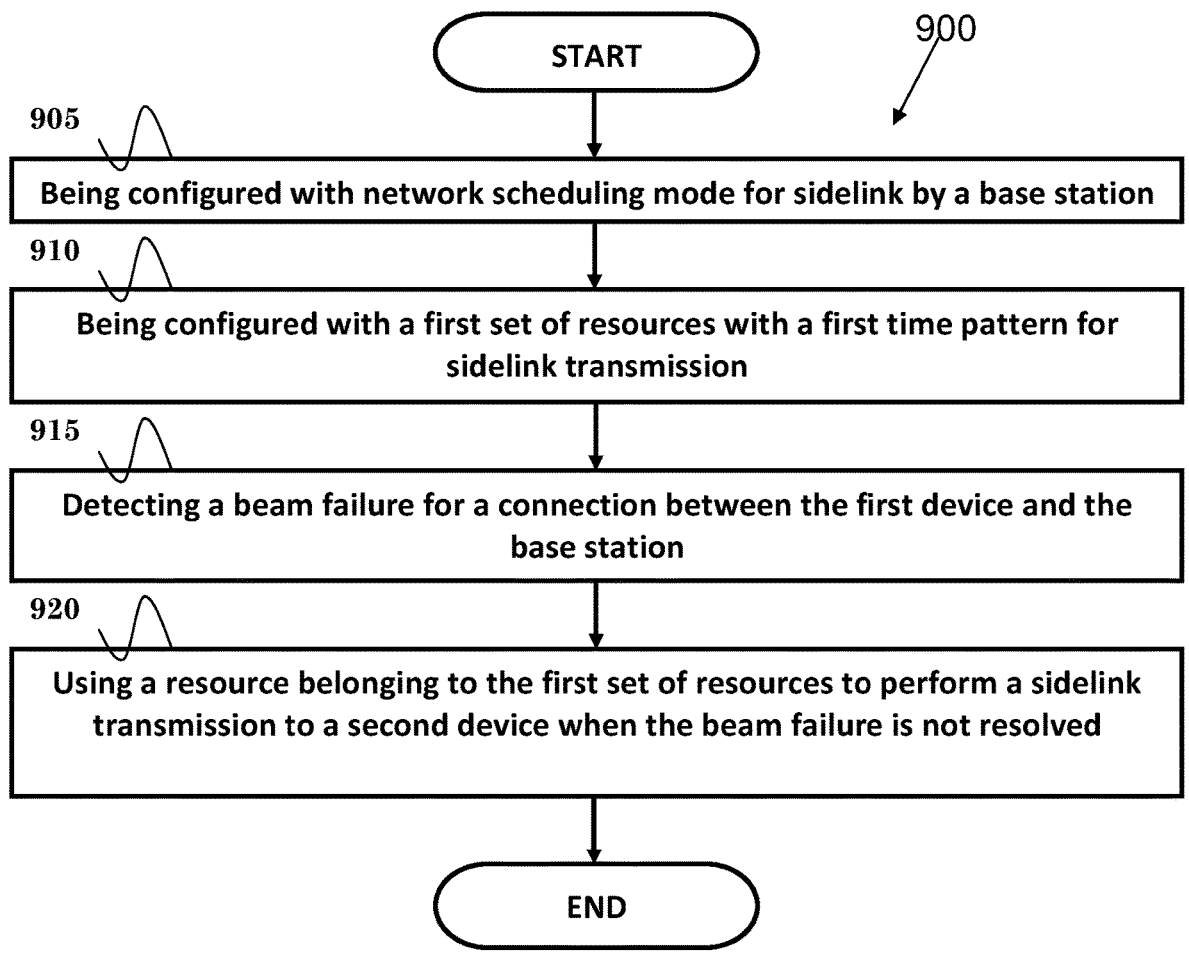
FIG. 9 is a flow chart according to one exemplary embodiment.

FIG. 9 is a flow chart 900 according to one exemplary embodiment from the perspective of a first device for performing sidelink communication. In step 905, the first device is configured with network scheduling mode for sidelink by a base station. In step 910, the first device is configured with a first set of resources with a first time pattern for sidelink transmission. In step 915, the first device detects a beam failure for a connection between the first device and the base station. In step 920, the first device uses a resource belonging to the first set of resources to perform a sidelink transmission to a second device when the beam failure is not resolved.

In one embodiment, the first set of resources with the first time pattern could be sidelink grant free resources or sidelink SPS resources. In one embodiment, the first time pattern may indicate periodic sidelink transmission opportunities. The beam failure could be detected due to (or in response to) reaching maximum times of beam failure instance. The connection could be a beam pair link or a Uu connection.

In one embodiment, the first device may be in RRC CONNECTED. The first set of resources with the first time pattern could be usable or available to perform a sidelink transmission without receiving an activation command.

In one embodiment, the first device could use the first set of resources with the first time pattern if the first device detects the beam failure (and not resolved). The first device could use the first set of resources with the first time pattern (to perform sidelink transmission) even if the first device does not detect the beam failure. The first device could use the first set of resources with the first time pattern (to perform sidelink transmission) when the first device does not detect the beam failure.

In one embodiment, the first set of resources with the first time pattern could be configured on a first carrier. The first device could be configured with a second set of resources with a second time pattern on a second carrier. The first set of resources with the first time pattern could be configured through a dedicated signaling (e.g. RRC message).

In one embodiment, the first time pattern could include a periodicity. The first time pattern could include a bitmap for indicating transmission opportunities within an interval.

Referring back to FIGS. 3 and 4, in one exemplary embodiment of a first device for performing sidelink communication, the device 300 includes a program code 312 stored in the memory 310. The CPU 308 could execute program code 312 to enable the first device (i) to be configured with network scheduling mode for sidelink by a base station, (ii) to be configured with a first set of resources with a first time pattern for sidelink transmission, (iii) to detect a beam failure for a connection between the first device and the base station, and (iv) to use a resource belonging to the first set of resources to perform a sidelink transmission to a second device when the beam failure is not resolved. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first device to perform sidelink communication, comprising:
   being configured with a resource pool and an exceptional resource pool different from the resource pool;
   being configured with network scheduling mode for sidelink by a network node;
   being configured with a first set of resources with a first time pattern in the resource pool for sidelink transmission through a dedicated signaling from the network node;
   using the first set of resources with the first time pattern in the resource pool to perform sidelink transmission prior to detection of a beam failure by the first device;
   detecting the beam failure between the first device and the network node; and
   continuing to use the first set of resources with the first time pattern in the resource pool to perform sidelink transmission to a second device after the detection of the beam failure and when the beam failure is not resolved, wherein the first set of resources with the first time pattern is usable or available to perform sidelink transmission without receiving an activation signaling from the network node, and wherein the first device stops using the first set of resources with the first time pattern in the resource pool to perform sidelink transmission to the second device when the first device receives a RRC (Radio Resource Control) reconfiguration message from the network node after the beam failure is resolved.

2. The method of claim 1, wherein the first set of resources with the first time pattern is sidelink SPS (Semi-Persistent Scheduling) resources.

3. The method of claim 1, wherein the beam failure is detected in response to reaching maximum times of beam failure instance.

4. The method of claim 1, wherein when the first device detects the beam failure and the beam failure is not resolved, the first device does not perform sidelink transmission on resource in the exceptional resource pool.

5. The method of claim 1, wherein the exceptional resource pool is (pre-)configured through system information.

6. The method of claim 1, wherein the first device is in RRC CONNECTED.

7. The method of claim 1, wherein the activation signaling is a sidelink grant or a control signaling addressed to a sidelink RNTI (Radio Network Temporary Identifier) of the first device.

8. The method of claim 1, wherein the first time pattern includes a periodicity or a bitmap for indicating periodic sidelink transmission opportunities.

9. The method of claim 1, wherein the first set of resources is dedicated to the first device, and/or
   wherein the first device uses the first set of resources without random selection to perform sidelink transmission, and/or
   wherein resources in the exceptional resource pool are utilized by devices based on random selection, instead of network scheduling.

10. A method for a first device to perform sidelink communication, comprising:
    being configured with a resource pool and an exceptional resource pool different from the resource pool;
    being configured with network scheduling mode for sidelink by a network node;
    being configured with a first set of resources with a first time pattern in the resource pool for sidelink transmission through a dedicated signaling from the network node;
    using the first set of resources with the first time pattern in the resource pool to perform sidelink transmission prior to detection of a L1 problem by the first device;
    detecting the L1 problem between the first device and the network node; and
    continuing to use the first set of resources with the first time pattern in the resource pool to perform sidelink transmission to a second device after the detection of the L1 problem and when the L1 problem is not resolved, wherein the first set of resources with the first time pattern is usable or available to perform sidelink transmission without receiving an activation signaling from the network node, and wherein the first device stops using the first set of resources with the first time pattern in the resource pool to perform sidelink transmission to the second device when the first device receives a RRC (Radio Resource Control) reconfiguration message from the network node after the L1 problem is resolved.

11. The method of claim 10, wherein the first set of resources with the first time pattern is sidelink SPS (Semi-Persistent Scheduling) resources.

12. The method of claim 10, wherein the first device is in RRC CONNECTED.

13. The method of claim 10, wherein the activation signaling is a sidelink grant or a control signaling addressed to a sidelink RNTI (Radio Network Temporary Identifier) of the first device.

14. The method of claim 10, wherein the L1 problem is that physical layer of the first device detects physical layer problems via detecting a number of consecutive out-of-sync indications or when T310 (or T311) is running.

15. The method of claim 10, wherein when the first device detects the L1 problem and the L1 problem is not resolved, the first device does not perform sidelink transmission on resource in the exceptional resource pool.

16. The method of claim 10, wherein the exceptional resource pool is (pre-)configured through system information.

17. The method of claim 10, wherein the first time pattern includes a periodicity or a bitmap for indicating periodic sidelink transmission opportunities.

18. The method of claim 10, wherein the first set of resources is dedicated to the first device, and/or
    wherein the first device uses the first set of resources without random selection to perform sidelink transmission, and/or
    wherein resources in the exceptional resource pool are utilized by devices based on random selection, instead of network scheduling.

* * * * *